United States Patent [19]

Boulanger

[11] Patent Number: 4,919,822
[45] Date of Patent: Apr. 24, 1990

[54] METHOD OF CONFINING WASTES UNDERGROUND IN A CAVITY LEACHED OUT OF SALT

[75] Inventor: Alain Boulanger, Levallois-Perret, France

[73] Assignee: Geostock S.A.R.L. and ESYS S.A., France

[21] Appl. No.: 282,798

[22] Filed: Dec. 12, 1988

[30] Foreign Application Priority Data

Dec. 11, 1987 [FR] France .............................. 8717347

[51] Int. Cl.$^5$ .............................................. B65G 5/00
[52] U.S. Cl. .................................... 210/747; 210/751; 210/753; 405/53; 405/59
[58] Field of Search ............... 166/77.5, 372; 210/747, 210/751, 753; 405/53-59, 128, 129

[56] References Cited

U.S. PATENT DOCUMENTS

| | | | |
|---|---|---|---|
| 2,787,455 | 4/1957 | Knappen | 405/58 |
| 2,986,007 | 5/1961 | Shook | 405/58 |
| 3,277,654 | 10/1966 | Shiver | 405/59 |
| 3,745,770 | 7/1973 | Fraser et al. | 405/59 |
| 3,887,462 | 6/1975 | Lagess et al. | 210/747 |
| 3,980,558 | 9/1976 | Thompson | 405/128 |
| 4,435,290 | 3/1984 | Lindorfer et al. | 210/747 |
| 4,576,513 | 3/1986 | Lindorfer et al. | 210/747 |
| 4,577,999 | 3/1986 | Lindorfer et al. | 405/59 |
| 4,580,924 | 4/1986 | Boulanger et al. | 405/56 |
| 4,596,490 | 6/1986 | Van Fossan et al. | 405/53 |
| 4,671,700 | 6/1987 | Boulanger et al. | 405/56 |
| 4,744,829 | 5/1988 | Eirich et al. | 210/751 |

FOREIGN PATENT DOCUMENTS

| | | | |
|---|---|---|---|
| 0157101 | 10/1985 | European Pat. Off. | 405/53 |
| 0145462 | 12/1980 | Fed. Rep. of Germany | 405/53 |
| 3141885 | 5/1983 | Fed. Rep. of Germany | 405/53 |
| 2562044 | 10/1985 | France | 405/128 |

Primary Examiner—Peter Hruskoci
Assistant Examiner—Joseph Drodge
Attorney, Agent, or Firm—Sughrue, Mion, Zinn, Macpeak & Seas

[57] ABSTRACT

A method of geologically confining toxic industrial waste, the method consisting of: using a cavity (1) previously leached from a mass of rock salt (2), the cavity being initially filled with brine (5); incorporating the waste in a pumpable waste-containing mixture (10) of density greater than the density of the brine and suitable for setting once put into place; inserting a predetermined quantity of a buffer liquid (7) into the bottom of the cavity by means of a dip tube (8) positioned in a well (4) and in communication with the surface (3), the buffer liquid being immiscible both with the brine and with the waste-containing mixture, the density of the buffer liquid lying between the density of the brine and the density of the waste-containing mixture, and the buffer liquid including one or more halogen-containing solvents; inserting the waste-containing mixture into the cavity by the means of the dip tube while the bottom end of the dip tube is maintained within the previously inserted buffer liquid; and removing the brine at the surface as it is displaced by the waste-containing mixture being inserted into the cavity.

10 Claims, 5 Drawing Sheets

METHOD OF CONFINING WASTES UNDERGROUND IN A CAVITY LEACHED OUT OF SALT The invention relates to a method of confining wastes, in particular, toxic industrial wastes in solid, semi-solid, or liquid form, in an underground cavity formed in salt, in particular in an underground pocket leached out from the salt.

BACKGROUND OF THE INVENTION

An underground cavity leached out from salt may be several hundreds of meters tall starting from a depth which is also several hundreds of meters, with the diameter being typically several tens of meters. For example, an existing group of cavities extend between $-900$ m to $-1500$ m below ground level, and have varying diameters in the range of from 50 m to 80 m. Normally such a cavity is full of salt water or brine. Technically, it is possible to fill such a cavity with waste after it has been completely emptied by injecting gas (air, nitrogen, etc.) therein. However, this method poses numerous problems, and, in particular, it is very expensive because of the great depths at which work is performed.

The cavity can be emptied by pumping and injecting a gas under atmospheric pressure, but in that case the mechanical integrity of the cavity may be in danger because of the plastic properties of salt: salt is subject to creep. In order to increase the gas pressure sufficiently to oppose creep, it would be necessary to provide very high power compressors and to use very large quantities of gas. Such cavities frequently have volumes of several tens of thousands of cubic meters, and pressures of more than 100 bars are often required.

It would therefore be necessary to remove the brine by displacing it by means of the waste. However this solution is not very satisfactory since the extracted brine would be contaminated by contact with the waste, and this would prevent it from being dumped in the natural environment or subsequently used for commercial purposes, and would give rise to problems relating to protection of the environment.

Further, after the cavity has been filled, if the waste is in the form of a liquid or a semi-solid, or in the form of solid grains, it behaves like a fluid and transmits the geostatic pressure at the bottom of the cavity up to the top of the cavity. This pressure is high and is poorly withstood by the top of the cavity. This can give rise to fractures with the waste being put into communication with underground water above the cavity.

The object of the present invention is to provide a method of confining waste in an underground cavity leached out from salt, but avoiding the drawbacks of the prior art as described above.

SUMMARY OF THE INVENTION

The present invention provides a method of geologically confining toxic industrial waste, the method consisting of:

using a cavity previously leached from a mass of rock salt, the cavity being initially filled with brine;

incorporating the waste in a pumpable waste-containing mixture of density greater than the density of the brine and suitable for setting once put into place;

inserting a predetermined quantity of a buffer liquid into the bottom of the cavity by means of a dip tube positioned down a well in communication with a portion of the brine between the ground surface and the bottom of the cavity, the buffer liquid being immiscible both with the brine and with the waste-containing mixture, the density of the buffer liquid lying between the density of the brine and the density of the water-containing mixture, and the buffer liquid including one or more halogen-containing solvents;

inserting the waste-containing mixture into the cavity by means of the dip tube while the bottom end of the dip tube is maintained within the previously inserted buffer liquid; and removing the brine at the surface as it is displaced by the waste-containing mixture being inserted into the cavity.

After being filled, the cavity is closed, e.g. by casting a preparation into the top thereof, the preparation including a hydraulic binder, which may optionally be the same as the binder used for the waste-containing mixture.

In an implementation of the invention, the halogen-containing solvents contain chlorine, but other halogens such as bromine or fluorine may also be used.

Advantageously, the waste-containing mixture includes a hydraulic binder, and the binder may include fly ash.

The buffer liquid and the waste-containing mixture are inserted preferably into the cavity by means of a tube constituted by elements capable of being disassembled from each other, with each tube element extending over a height which is less than the predetermined height.

BRIEF DESCRIPTION OF THE DRAWINGS

The implementation of the invention is described by way of example with reference to the accompanying drawings, in which.

DETAILED DESCRIPTION OF THE PREFERRED EMBODIMENT

Figure 1:
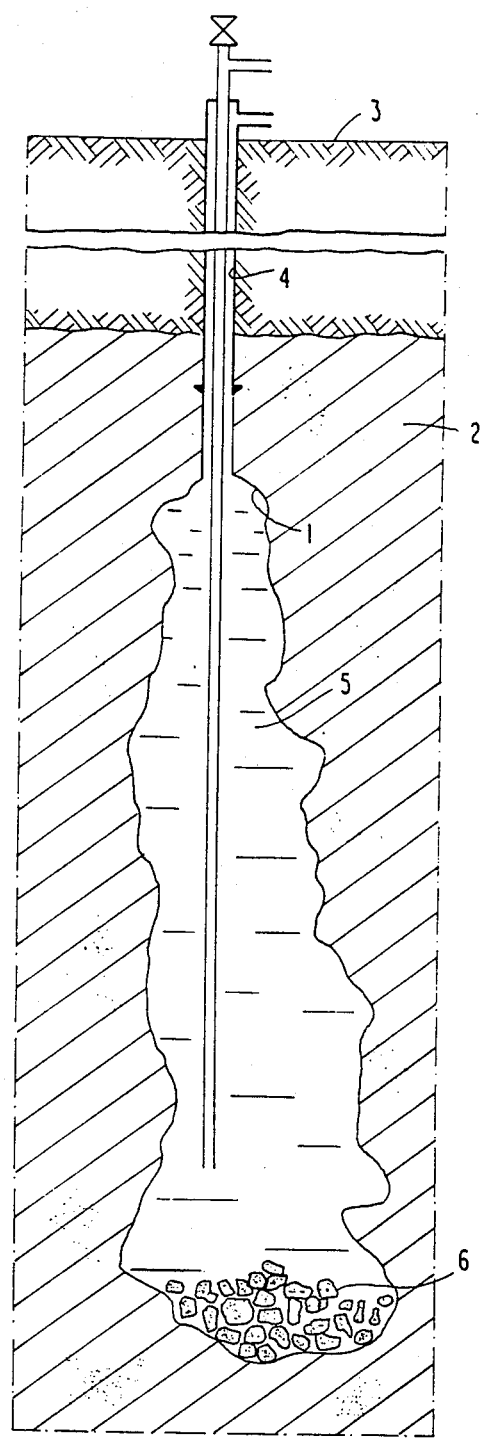
FIG. 1 is a section view through a cavity formed by leaching away salt.

In FIG. 1, an underground cavity 1 leached from a mass of salt 2 communicates with the surface of the ground 3 by means of a well 4 which is drilled and prepared in a conventional manner. At rest, this cavity is filled with brine 5. Insoluble lumps of solid 6 are to be found at the bottom of the cavity.

Figure 2:
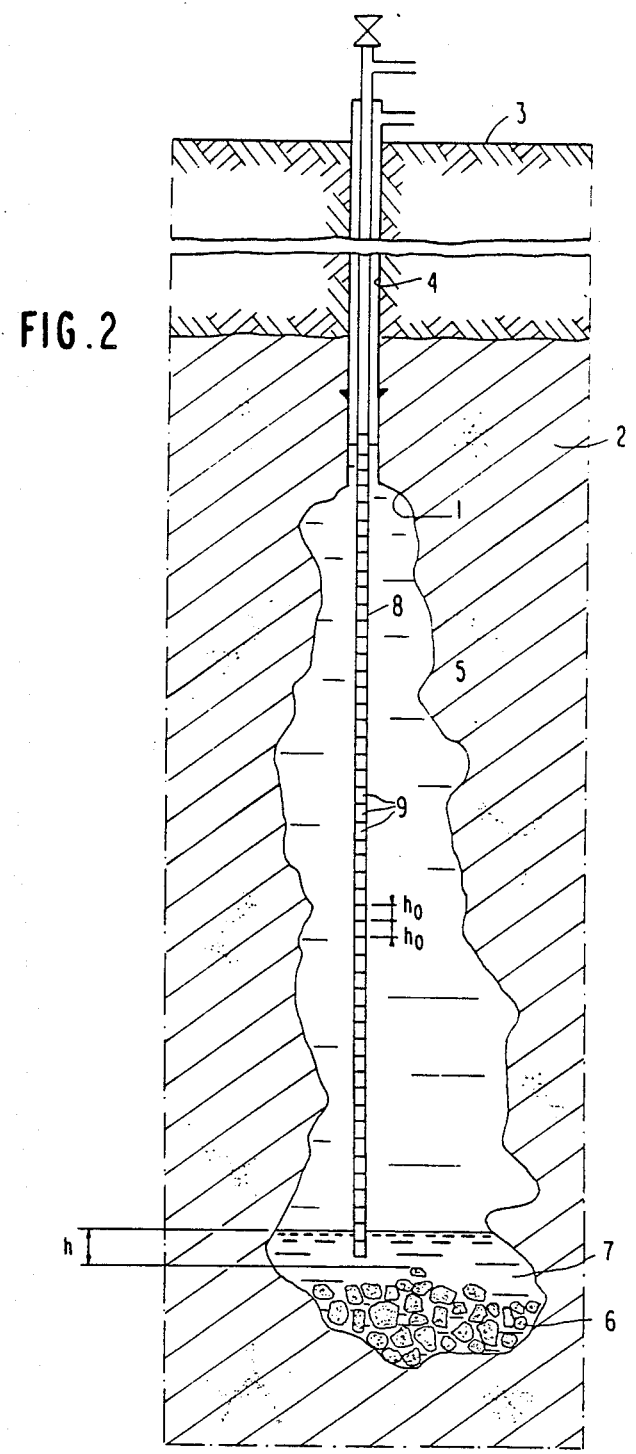
FIGS. 2 to 4 are section views through the FIG. 1 cavity while it is being filled using the method of the invention.
Figure 3:
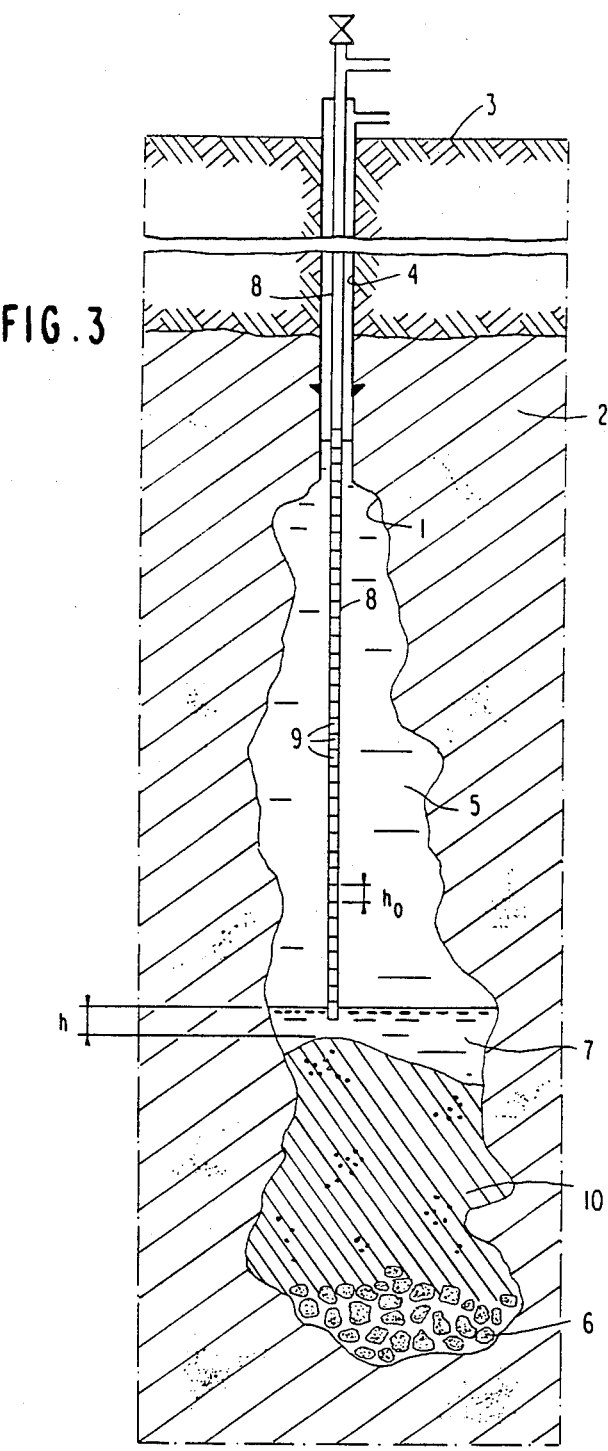

In FIG. 2, a buffer liquid 7 has been inserted in the bottom of the cavity 1 by means of a tube 8 so as to occupy a depth h, i.e., between the surface of buffer liquid 7 and the top of the pile of insoluble lumps 6. This tube 8 is made up of identical tube elements 9 each of which has a height $h_o$. In accordance with the invention, precautions are taken to ensure that:

$$h > h_o$$

Buffer liquid 7 is of greater density than brine. Therefore it moves the brine 5 upwards, and the buffer liquid 7 begins by occupying, at least in part, the interstices between the insoluble lumps 6. The brine may be recovered at the head of the drilled well 4.

The density of brine is generally about 1.2. The buffer liquid which includes a halogen-containing solvent, e.g. a chlorine-containing solvent, preferably has a density lying in the range of between 1.3 to 1.7.

Waste material is incorporated into a pumpable mixture 10 comprising as low-setting hydraulic binder and in which waste initially in solid form is fractionated into the form of granules having a typical diameter of a few centimeters, and the mixture is injected into the cavity by means of the tube 8 to occupy the free height h of the buffer liquid 7.

According to the invention, precautions are taken to ensure that h is always greater than $h_0$. In this way, it is always possible to position the end of the tube 8 within the free height, between the surface of the buffer liquid 7 and the top of the pile of mixture by shortening the tube 8 by one element 9 at a time, if necessary.

The binder sets progressively and ends up by constituting, together with the waste, a solid block capable of opposing salt creep, thereby ensuring that the walls of the cavity 1 stand up mechanically. In addition, because of the binder, the waste does not behave like a fluid, and the geostatic pressure at the bottom of the cavity is not transmitted to the top of the cavity 1.

By virtue of the method of the invention, direct contact never occurs between the brine and the waste since they are always separated by the buffer liquid. Although the brine 5 is displaced, indirectly, by the waste, nevertheless, it is not contaminated by the waste, and therefore it may be recovered and sold. This absence of contact provides the additional advantage of preventing the waste from contaminating the environment.

Figure 4:
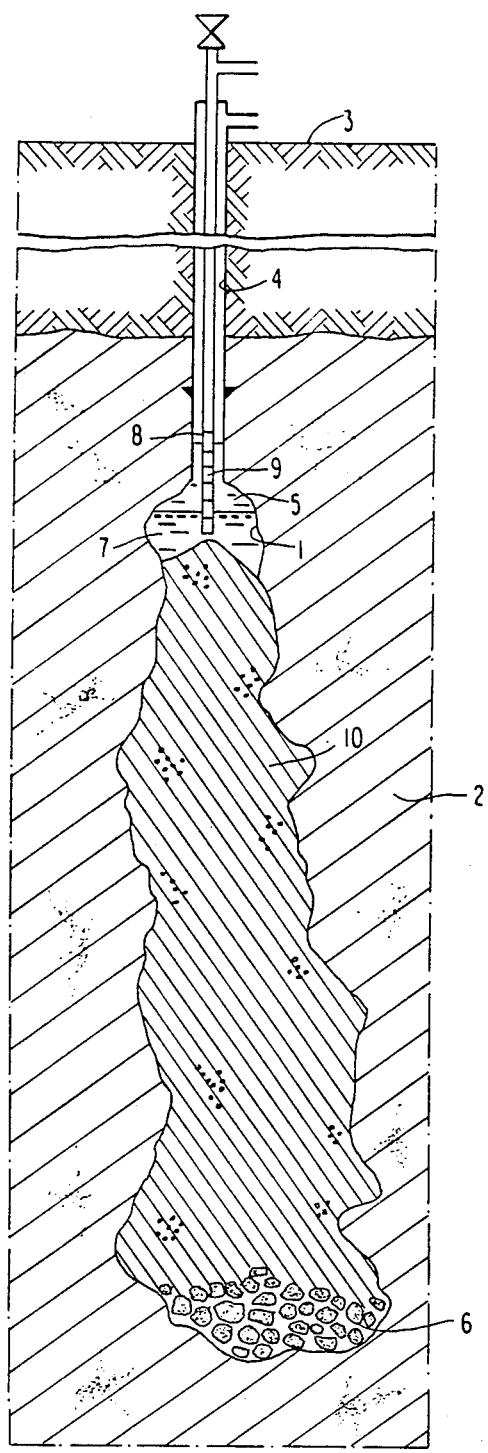

FIG. 4 shows the cavity with the filling operation being completed.

Figure 5:
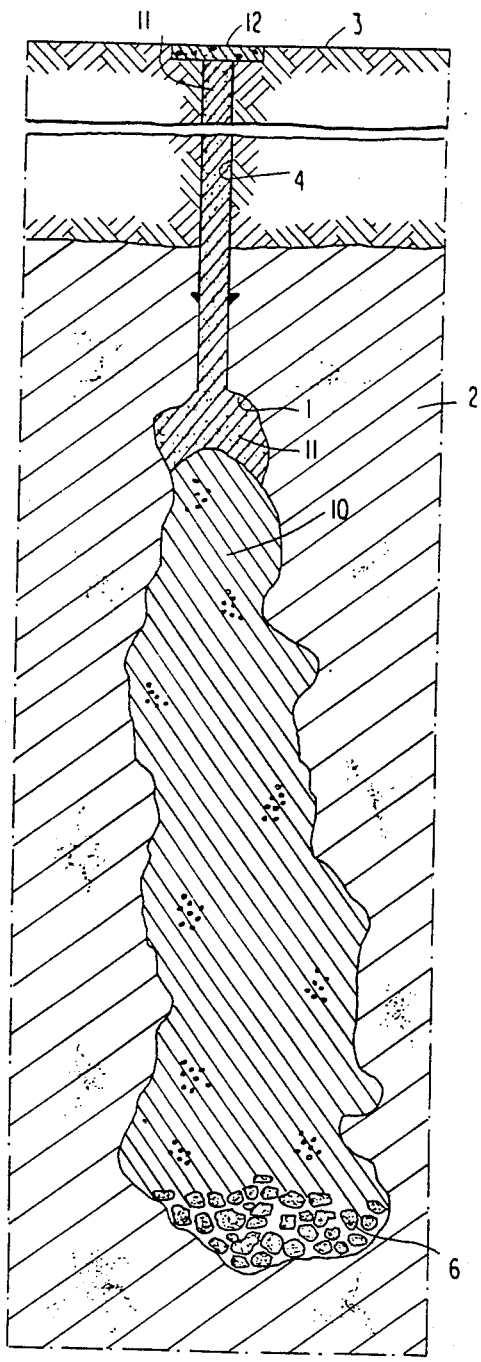
FIG. 5 is a section view through the cavity of FIGS. 1 to 4 after it has been filled using the method of the invention.

In FIG. 5, once the cavity has been filled, it is plugged by casting binder 11 on top of the waste mixture 10 substantially up to the top of the well 4. The binder in the plug 11 may optionally be the same as the binder used for binding the waste. A concrete slab 12 is subsequently cast to finish off the work at the top of the well.

The criteria for selecting the binder and the buffer liquid are constituted essentially by density requirements.

The binder may be made from fly ash from a plant for incinerating household waste, mixed with lime from a plant for manufacturing calcium carbide.

The waste may be subjected to a prior conditioning stage. For example it may be dispersed in a solid matrix in the form of a closed-cell foam, with each foam cell containing an accumulation of waste, or it may be coated. This may be desirable, for example, in cases where the waste contains inhibitors that would prevent the binder from setting.

The waste may also constitute a portion of the binder: this is particularly true of waste in the form of an aqueous solution that may be used as mixing water for the binder.

I claim:

1. A method of geologically confining toxic industrial waste, the method comprising:
   using a cavity previously leached from a mass of rock salt, said cavity being initially filled with brine;
   incorporating said waste in a pumpable waste-containing mixture of density greater than the density of said brine which is prepared so that setting occurs once said waste is inserted in said cavity;
   inserting a predetermined quantity of a buffer liquid into the bottom of said cavity by means of a dip tube positioned in a well so as to establish a communication with a portion of the brine between the ground surface and the bottom of the cavity, the buffer liquid being immiscible both with said brine and with said waste-containing mixture, the density of the buffer liquid lying between the density of said brine and the density of said waste-containing mixture, and the buffer liquid including one or more halogen-containing solvents;
   inserting said waste-containing mixture into said cavity by means of said dip tube while the bottom end of said dip tube is maintained within said previously inserted buffer liquid; and
   removing said brine at the surface as it is displaced by said waste-containing mixture being inserted into said cavity.

2. A method according to claim 1, wherein said buffer liquid has a density lying in the range of from 1.3 to 1.7.

3. A method according to claim 1, wherein said waste is subjected, prior to being inserted into said cavity to conditioning comprising:
   incorporating the waste in a solid matrix if it is initially in liquid form.

4. A method according to claim 1, wherein said mixture is obtained by mixing said waste with at least one slow-setting hydraulic binder.

5. A method according to claim 4, wherein said hydraulic binder contains water and lime, together with fly ash.

6. A method according to claim 4, wherein once the entire cavity has been filled with said mixture all of the buffer liquid is removed from the well and a hydraulic binder is cast into said well, and wherein said hydraulic binder has the same composition as a binder constituting a portion of said mixture.

7. A method according to claim 1, wherein said dip tube is made up of disassemblable elements each of which has a length $h_0$, with said predetermined quantity of said buffer liquid being calculated so that the depth h of the buffer liquid in the cavity always remains greater than said length $h_0$ of the tube elements, with the bottom end of the tube being maintained throughout the period of insertion of the mixture within the buffer liquid by disassembling the tube, element by element.

8. A method according to claim 1, wherein once the entire cavity has been filled with said mixture, all of the buffer liquid is removed from the well and a hydraulic binder is finally cast into said well.

9. A method according to claim 1, wherein said waste is subjected, prior to being inserted into said cavity, to conditioning comprising;
   fractionating solid into granules having a typical diameter of a few centimeters if toxic items are contained in said solids.

10. A method according to claim 1, wherein said waste is subjected, prior to being inserted into said cavity, to conditioning comprising:
    incorporating the waste in a solid matrix if it is initially in liquid form and when the toxic items are contained in solids, in fractionating said solids into granules having a typical diameter of a few centimeters.

* * * * *